(No Model.)
R. P. SELLON.
ELECTRIC METER.
No. 404,310. Patented May 28, 1889.
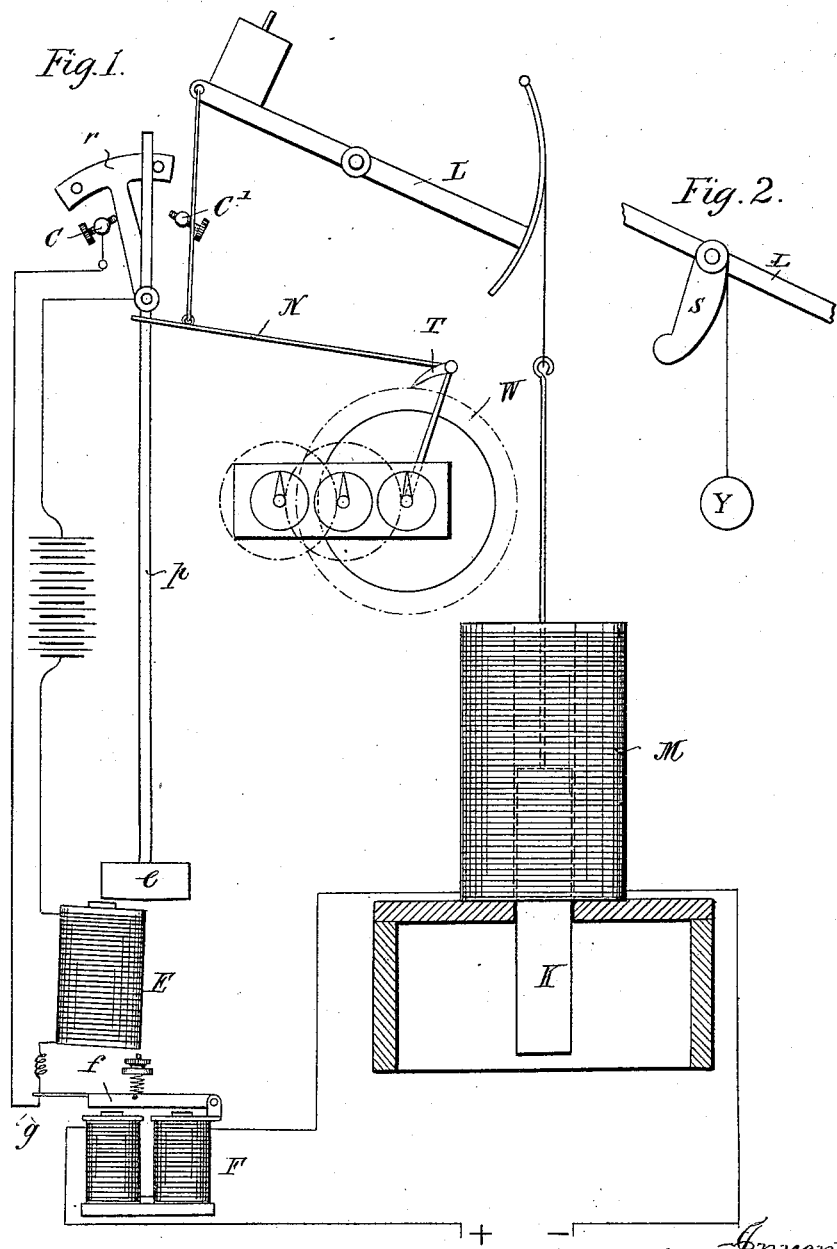
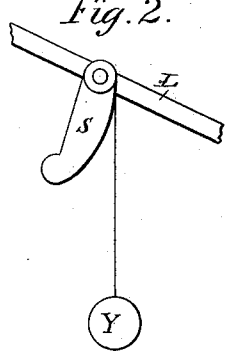
Fig. 2.
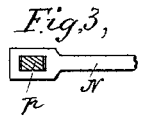
Fig. 3.
Attest
Philip Mauro
Jas. K. McGathran
Inventor
Robert Percy Sellon
by
A. Pollok
his attorney

UNITED STATES PATENT OFFICE.

ROBERT PERCY SELLON, OF LAMBETH, COUNTY OF SURREY, ENGLAND.

ELECTRIC METER.

SPECIFICATION forming part of Letters Patent No. 404,310, dated May 28, 1889.

Application filed March 6, 1889. Serial No. 302,046. (No model.) Patented in England May 14, 1886, No. 6,508.

*To all whom it may concern:*

Be it known that I, ROBERT PERCY SELLON, electrical engineer, a subject of the Queen of Great Britain, residing at Victoria Works, 112 Belvedere Road, Lambeth, in the county of Surrey, England, have invented certain Improvements in Electric Meters, (for which I have obtained a patent in Great Britain, No. 6,508, dated May 14, 1886,) of which the following is a specification.

My invention relates to apparatus for measuring and recording the passage of electric currents, so that the quantity flowing may be accurately indicated or registered. According to my invention, I, on the passage of electric current through an electro-magnet, (or magnets,) cause a pendulum to reciprocate or have motion imparted to it, or I obtain motion by any other convenient means. This electro-magnet, in the case where a supply of current at approximately constant electromotive force is maintained, may be wound with a comparatively fine wire and may be placed in circuit with any suitable source of electrical energy. Thus a constant motion is obtained on the pendulum or other body to which motion is imparted so long as a constant potential is maintained at the main wires across which the electro-magnet is connected, or motion may be obtained in other convenient and well-known manner. This pendulum or moving body imparts a reciprocating motion to a pawl or catch by means of a suitable link or connection placed between the pendulum and the pawl, the extent of motion imparted by the pendulum to the pawl being determined by an electro-magnet, electro-magnets, or solenoid, or other suitable device affected by the passage of current. This latter magnet or solenoid, when the meter is placed across the source of constant electromotive-force supply, is wound with coarse wire and is placed in series with the lamps, motors, or other devices of which it is required to measure the consumption of electricity. The pawl may be made to engage with a wheel or other suitable device, which in turn operates a series of indicating-dials. By so arranging that the throw of the pawl or catch shall be increased as the current (passing through the electro-magnet or solenoid and to be measured) increases and diminished as the current to be measured diminishes, the dials will register the amount of current passed. This may conveniently be effected by making the extent of motion of the link and pawl dependent upon the position of a snail, curve, or eccentric actuated by the magnet through which the electricity to be measured flows, this snail, curve, or eccentric being so shaped with reference to the action of the above magnet under varying currents of electricity as to determine for the link, and therefore the pawl, a movement which produces registration upon the recording-dials in exact correspondence with the varying amounts of electricity which it is desired to measure.

The accompanying drawings clearly illustrate one method of carrying out my invention, Figure 1 being a general view in elevation of the apparatus, and Figs. 2 and 3 details.

E is an electro-magnet, by means of which the pendulum $p$, to which an armature, $e$, is attached, is maintained in motion, the necessary opening and closing of the circuit of the magnet being effected at the contact-screws $c$ $c'$ by the motion imparted by the pendulum to the rocking piece $r$, or by other convenient means, which may be such as are well known and commonly adopted in connection with electric clocks.

It is preferable, in order to avoid unnecessary waste of energy and wear and tear, that the pendulum should only be in operation when there is useful work being done which it is desired to measure. To attain this end I provide a magnet, F, which is energized by the current passing in the circuit to be measured. In connection with this magnet F is an armature, $f$, held away from the magnet F by a spring or other suitable means, and when held away breaking at the point $g$ the circuit of the magnet E, which actuates the pendulum. Thus when the current is not energizing the magnet F, the pendulum $p$ is not in operation; but when a predetermined minimum of current energizes the magnet F, the circuit of the magnet E is closed at the point $g$ by the magnet F attracting its armature $f$ and the pendulum $p$ is put into motion. To automatically produce motion of the pendulum upon the passage of the current, the magnet E is fixed, as shown, at a slight angle to one side of the position assumed by the armature e when at rest. Thus when the magnet E is energized the pendulum commences to oscillate, these oscillations increasing in extent until the normal swing of the pendulum is attained and so maintained as long as the circuit of the magnet E remains closed.

M is a solenoid-magnet energized by the current which it is desired to measure, which raises the core K more or less, according to the strength of current passing round it. The core K is connected to one end of the lever L, to the other end of which is connected a link, N. One end of the link is slotted or otherwise suitably arranged, so that it may slide freely up and down the pendulum-rod $p$. To the other end of the link N is attached the pawl I, which engages with the ratchet-wheel W, with which indicating-wheels are geared. Thus varying strengths of current passing in the magnet M will cause the core K to assume different positions, thereby rocking the lever L and so varying the extent of movement imparted by the pendulum-rod $p$ to the link N.

The greater the current passing in the magnet M the greater will be the motion of reciprocation of the link N, and consequently of the ratchet T upon the ratchet-wheel W. Therefore the greater will be the current registered, and vice versa.

If with any given solenoid M and core K it is found that the movements imparted to the link N are not in proportion to varying currents in the solenoid M, then, as already explained, a snail, curve, or eccentric or other suitable device may be interposed between the core K and the link N, as indicated in Fig. 2, where a snail or eccentric, S, attached to the lever L, is made to vary the lift of a weight, Y, so as to produce, as will be readily understood, extent of movement upon the link N (and therefore of throw upon the pawl T) in exact proportion to the variations of electric current (in the solenoid M) which it is desired to measure.)

Having now particularly described and ascertained the nature of my said invention and in what manner the same is to be performed, I declare that what I claim is—

1. In an electric meter, the combination of a moving body, such as a pendulum, a counting mechanism, a pawl for actuating the same, a link for transmitting the motion of said pendulum or body to said pawl, adjusting mechanism, as specified, for varying the point of connection between said link and said pendulum or body, and thereby varying the stroke of said pawl, and a solenoid in the circuit whose current is to be measured, the core of said solenoid being connected with and actuating said adjusting devices, substantially as described.

2. In electric meters, a moving body, such as a pendulum, a counting mechanism, a pawl or equivalent device acted upon by the said pendulum or moving body, so as to actuate the counting mechanism, a magnet or solenoid in the circuit of the current to be measured, and a lever, snail-cam, or equivalent device operated by the last-named magnet or solenoid to vary the stroke of the pawl or the like in accordance with the variation in the current to be measured, in combination with a magnet in the circuit of the said current and an armature which completes the circuit for operating the pendulum when a current to be measured is passing, all substantially as hereinbefore described.

3. In an electric meter, the combination of a counting mechanism, a pendulum, a pawl and ratchet-wheel actuated thereby, an oscillating link or connection-rod connected at one end with said pawl and at the other mounted on the pendulum-rod so as to move freely thereon, and an electro-magnetic device for moving said link vertically on said pendulum-rod as the current varies, substantially as described.

4. The combination of a moving body, such as a pendulum, a counting mechanism, a pawl, a variable connection for transmitting motion from said body to said pawl, a solenoid whose core controls said variable connection, a snail-cam or eccentric or a suitable axis interposed between said core and said connection, and a weight whose lift is varied by said eccentric or cam, substantially as described.

In testimony whereof I have signed my name to this specification in the presence of two subscribing witnesses.

ROBERT PERCY SELLON.

Witnesses:
ARTHUR CARRICK,
C. J. WATTS,
*Both of 5 Nicholas Lane, Lombard Street, London, E. C.*